(12) United States Patent
Gambacorta

(10) Patent No.: US 11,684,459 B2
(45) Date of Patent: *Jun. 27, 2023

(54) SECURE FRICTION RETAINED DENTURE

(71) Applicant: Enzo Gambacorta, Harrison, NY (US)

(72) Inventor: Enzo Gambacorta, Harrison, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 16/988,638

(22) Filed: Aug. 8, 2020

(65) Prior Publication Data
US 2021/0038349 A1 Feb. 11, 2021

Related U.S. Application Data

(60) Provisional application No. 62/884,254, filed on Aug. 8, 2019.

(51) Int. Cl.
A61C 8/00 (2006.01)

(52) U.S. Cl.
CPC .......... *A61C 8/0095* (2013.01); *A61C 8/0065* (2013.01); *A61C 8/0086* (2013.01)

(58) Field of Classification Search
CPC ... A61C 8/0095; A61C 8/0065; A61C 8/0086; A61C 8/0048; A61C 13/273; A61C 13/225; A61C 13/265; A61C 13/2653; A61C 13/2656; A61C 13/267; A61C 13/277; A61C 13/275; E05B 85/04
USPC .......................................................... 433/173
See application file for complete search history.

(56) References Cited

U.S. PATENT DOCUMENTS

| 3,730,578 | A  | * | 5/1973  | Gerlach ............... | G09F 3/0358 |
|           |    |   |         |                         | 292/318     |
| 5,234,341 | A  | * | 8/1993  | Johansen ............. | A61C 13/273 |
|           |    |   |         |                         | 433/172     |
| 9,907,629 | B2 | * | 3/2018  | Boehm ................ | A61C 8/0069 |
| 10,485,637| B2 | * | 11/2019 | Atkin ................. | A61C 8/0068 |
| 11,246,690| B2 | * | 2/2022  | Berger ................ | A61C 8/0048 |
| 2019/0374313 | A1 | * | 12/2019 | Lazarof .............. | A61C 8/0048 |
| 2022/0233290 | A1 | * | 7/2022  | Gambacorta ...... | A61C 13/2653 |

FOREIGN PATENT DOCUMENTS

WO  WO-0001318 A1 * 1/2000 ......... A61C 13/2656

OTHER PUBLICATIONS

Escomel; WO0001318A1 Translation; Jan. 13, 2000; Espacenet Translation (Year: 2000).*

* cited by examiner

*Primary Examiner* — Edward Moran
(74) *Attorney, Agent, or Firm* — James A. Italia; Italia IP

(57) ABSTRACT

A feature for retaining a denture on dental implants is shown and described. An anchor for receiving prongs is threaded to each of one or more implants in the mouth. A denture having prong passages is placed onto jaw bone or overlying tissue, above the implant. The anchor occupies an opening in the denture. With the denture in place and with the prong passages aligned with prong reception sites of the anchor, a pronged denture connector is installed such that the prongs pass through the prong passages of the denture and penetrate the prong reception sites of the anchor. The prongs are frictionally secured in place by an elastic member lining the prong passages of the denture and constricting over inserted prongs. The denture may comprise synthetic resin reinforced by a metallic reinforcing bar.

10 Claims, 6 Drawing Sheets

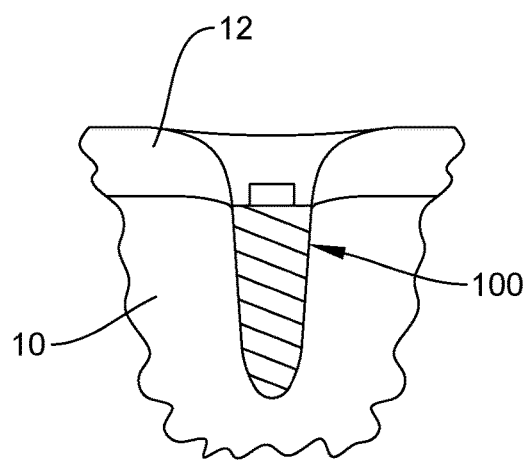
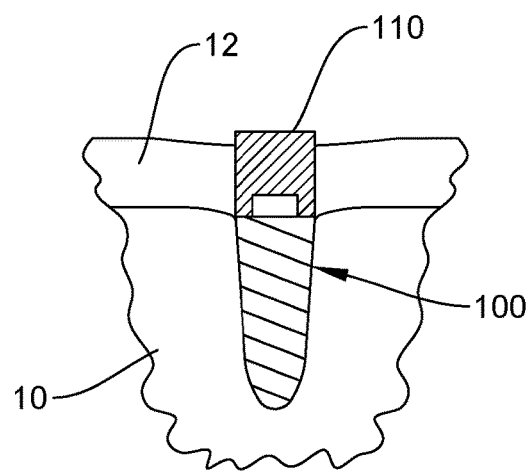
FIG. 1
FIG. 2
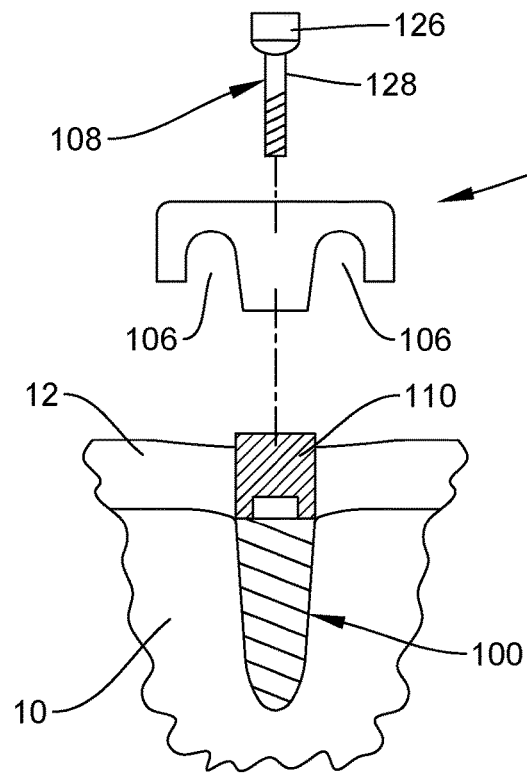
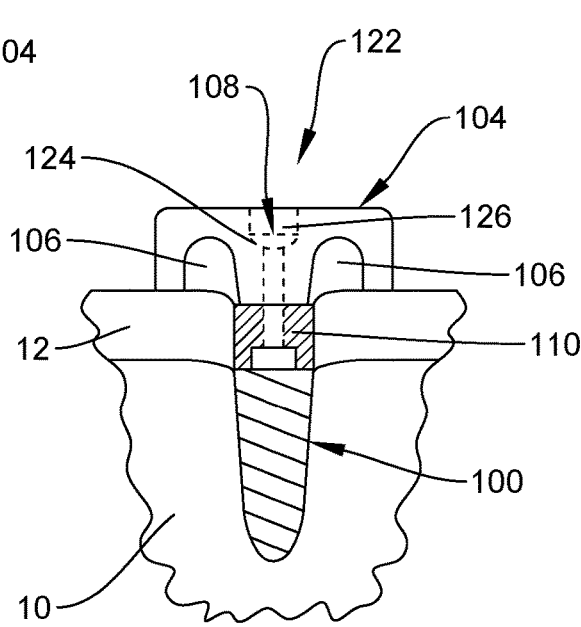
FIG. 3A
FIG. 3B

SECURE FRICTION RETAINED DENTURE

CROSS-REFERENCE TO RELATED APPLICATION

The present application claims the benefit of priority to U.S. Provisional Application Ser. No. 62/884,254 filed Aug. 8, 2019; the contents of which is incorporated by this reference.

FIELD OF THE INVENTION

The present invention relates to dentistry, and more particularly, to functionally secure frictionally retained dentures.

BACKGROUND OF THE INVENTION

Dentures are typically utilized within the dental field to replace a plurality of natural teeth using a single assembly. Dentures are typically secured to a patient's jaw by use of previously installed dental implants. A number of difficulties arise with prior art dentures. One is that they may require a relatively great number of implants to be properly supported within the mouth. Another is that it may be objectionable to fasten dentures in place using screws or bolts secured to the denture and threaded directly into the implant. For one thing, the implant may be oriented at an angle unsuitable for passing into or through the denture. Another issue may be that bone tissue at any given desired implant site may be eroded or otherwise unsuitable for securely supporting an implant.

There exists a need for denture attachment to the patient's jaw that requires relatively few implants. Also, there is a need to reduce precision in components and component alignment to assure secure attachment to the jaw.

SUMMARY OF THE INVENTION

The present invention sets forth a construction for manually, expeditiously, and securely mounting a denture on the jaw of a patient, using implants. An anchor for receiving prongs is threaded to each of one or more implants in the mouth. A denture having prong passages is placed onto jaw bone or overlying tissue, above the implant (if the lower jaw is being treated). The anchor penetrates the denture, occupying an opening in the denture. With the denture in place and with the prong passages aligned with prong reception sites of the anchor, a pronged denture connector is installed such that the prongs pass through the prong passages of the denture and penetrate the prong reception sites of the anchor. The prongs are frictionally secured in place by an elastic member lining the prong passages of the denture and constricting over inserted prongs. The denture may comprise synthetic resin reinforced by a metallic reinforcing bar.

The denture may include a recess configured to enable a pry tool to bear against the denture connector to remove the latter, for example, when replacing or servicing the denture.

The novel arrangement may be utilized with both partial and full arch dentures, the dentures stably secured using only two implants. Also, as will be further detailed hereinafter, it is not necessary to establish great precision in having the prongs and prong reception sites sized and aligned.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a side cross sectional view of a dental implant;

FIG. 2 shows a component added to FIG. 1;

FIG. 3A is a view of the implant of FIG. 1, with additional components shown exploded above the implant;

FIG. 3B shows the components of FIG. 3 fully assembled;

DETAILED DESCRIPTION

Figures 4, 5:
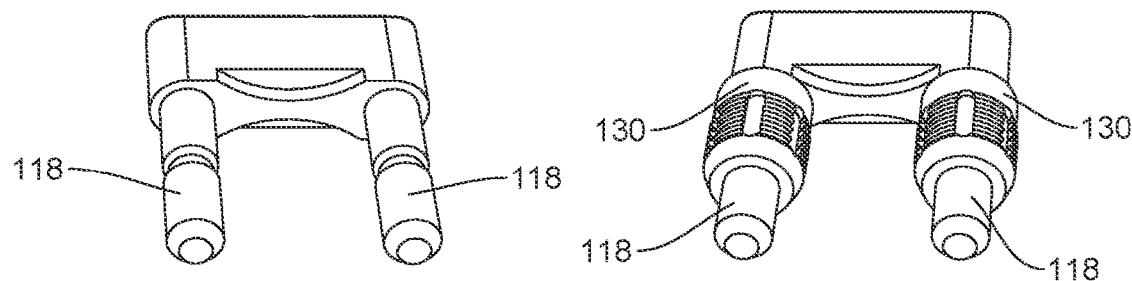
FIG. 4 is a perspective detail view of a component of the novel retention system.
FIG. 5 is similar to FIG. 4, but shows two additional components.

Referring first to FIG. 1, there is shown an implant 100 installed in a jaw bone 10 of a patient, with soft tissue such as gum tissue 12 overlying jaw bone 10. Implant 100 may be conventional and may preexist installation of a denture 102 (see FIGS. 6-9), or alternatively, may be fabricated and installed specifically for installation of denture 102. As seen in FIG. 2, a seat 110 for seating elements of a novel retention system for denture 102 sits atop implant 100. Seat 110 elevates a load bearing working surface of implant 100 from a location recessed within the jaw to a location reasonably flush with gum tissue 12. It would be possible to omit seat 110 if implant 100 were flush with the upper surface of jaw tissue. Ordinarily, implant 100 sits recessed below such upper surface.

It should be noted at this point that orientational terms such as overlying, atop, laterally, vertically, and transverse refer to the subject drawing as viewed by an observer. The drawing figures depict their subject matter in orientations of normal use, which could obviously change with changes in posture and position of the novel denture retention system as installed in a patient, or with use of an opposed jaw (drawings illustrate a lower jaw). Therefore, orientational terms must be understood to provide semantic basis for purposes of description, and do not limit the invention or its component parts in any particular way.

Referring also to FIGS. 3A-9, there are additionally shown elements of the novel retention system for frictionally retaining denture 102 to a jaw of the patient. The retention system may comprise at least one prong anchor 104 (shown isolated from other elements in FIG. 3A) having a plurality of prong reception sites 106 and an implant connector (e.g., a screw 108) configured to secure prong anchor 104 to dental implant 100.

The retention system may also comprise denture 102 comprising a base 112 (FIGS. 8 and 9), at least one prosthetic tooth 114 (FIG. 8) mounted to base 112, at least one opening 116 (FIG. 7) in base 112, opening 116 dimensioned and configured to receive an exposed portion of prong anchor 104 therein, and a plurality of prong passages 117 in base 112. Each of the prong passages 117 is dimensioned and configured to slidably receive a prong 118 (FIG. 4) therethrough.

The retention system also includes a denture connector 120 (FIGS. 4-6) having a plurality of parallel prongs 118 dimensioned and configured to pass through the prong passages of denture 102 and to be received within prong reception sites 106 (FIGS. 3A, 3B) of prong anchor 104.

Prong reception sites 106 of prong anchor 104 and the prong passages of base 112 of denture 102 are oriented to enable parallel prongs 118 of denture connector 120 to pass through denture 102 and be received laterally within the at least one prong anchor 104 when prong anchor 104 is coupled to dental implant 100 and dental implant 100 is vertically oriented. Given potential play of prongs 118 with respect to prong passages in denture 102, provision of two prongs 118 stabilizes coupling of denture 102 to prong anchor 104 and hence to the jaw.

Base 112 of denture 102 both establishes a structural member for engaging prong anchor 104 and denture connector 120, and also is preferably configured to provide realistic visual transition from the jaw to gum tissue surrounding prosthetic teeth 114.

Figure 9A:
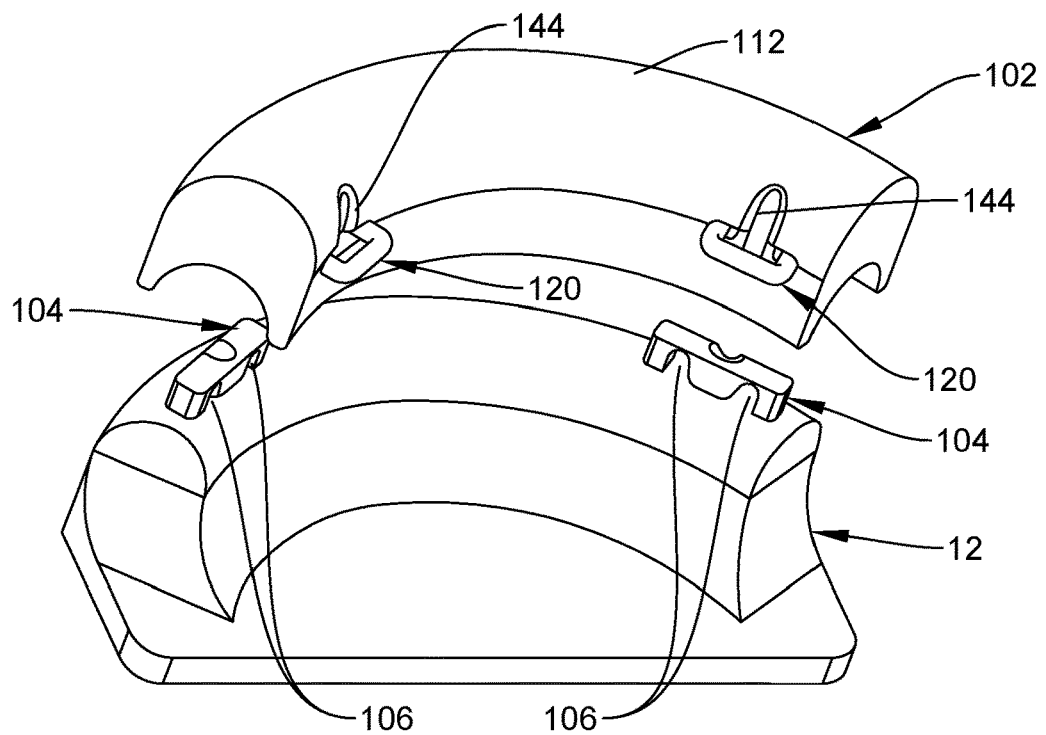
FIG. 9A is a rear exploded perspective view of the assembly of FIG. 8.
Figure 9B:
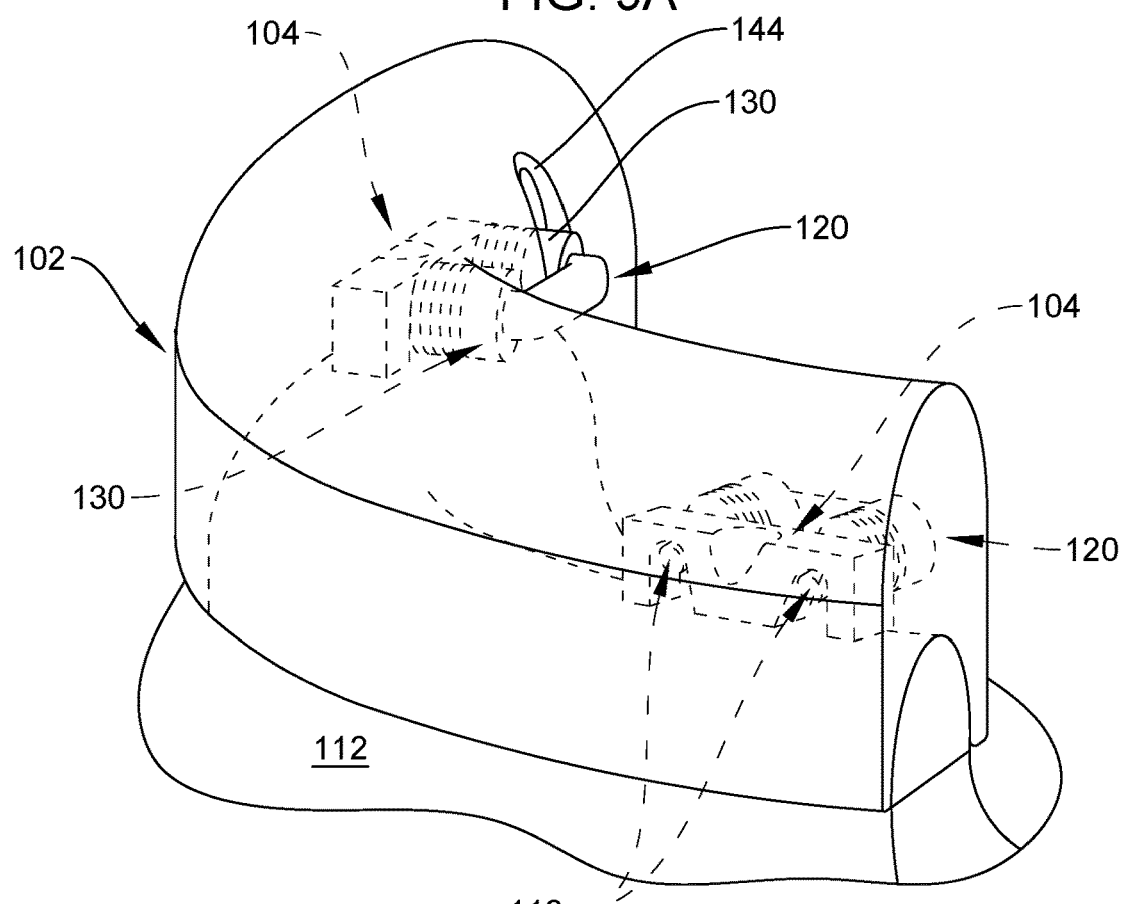
FIG. 9B is a frontal perspective view showing the assembly of FIG. 9A now fully assembled.

FIG. 9A shows denture 102 about to be lowered onto gum tissue, so that prongs 118 of denture connector 120 will enter prong reception sites 106. It will be appreciated that prong reception sites guide prongs 118 into place, but need not receive prongs 118 with great precision or with very close fit. Desired precision is provided by barrels 130, to be described hereinafter. FIG. 9B, a frontal view, shows denture 102 fully seated onto physiological features of the jaw of the patient, with denture connector 120 fully inserted.

In summary, denture 102 is held in place by interference fit of prongs 118 with prong reception sites 106, in that denture 102 cannot be elevated from its seated or installed position (as shown e.g. in FIG. 9B).

Figure 7:
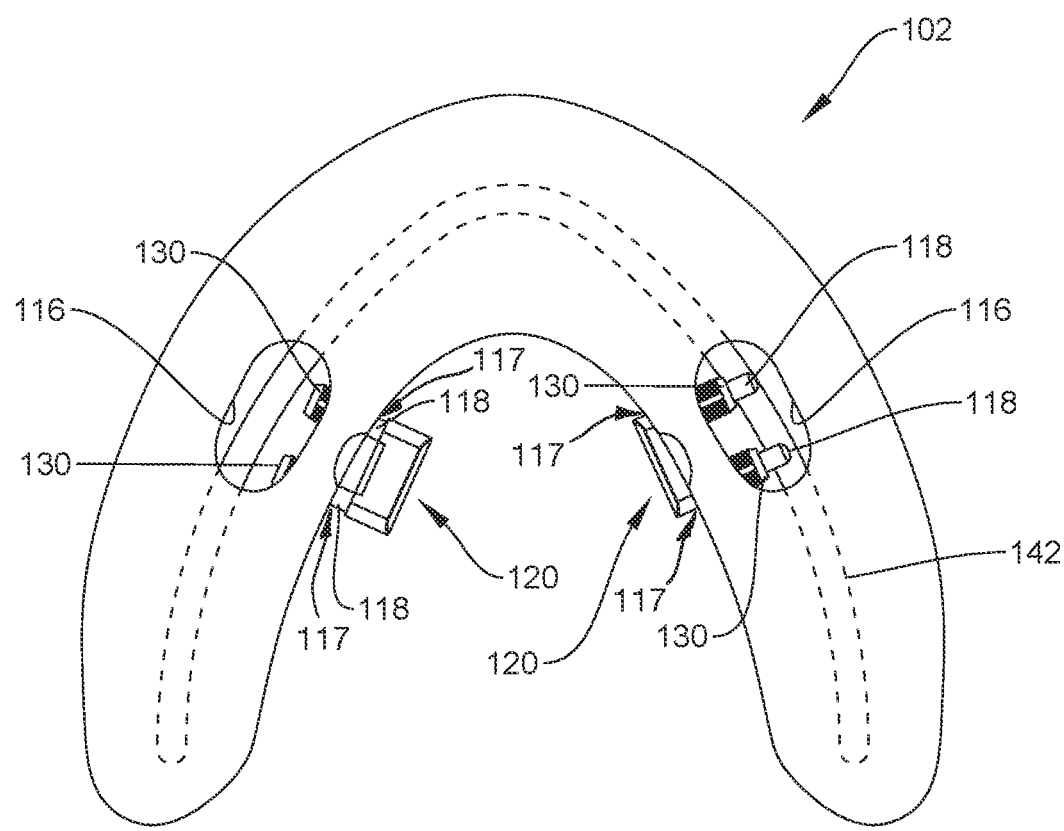
FIG. 7 is a bottom plan view of the denture omitted from FIG. 6.

Also seen in FIG. 7, the retention system may further comprise a metallic reinforcement bar 142 in base 112 of the denture, to distribute loads imposed for example by chewing when denture 102 is installed in the patient.

FIG. 7 depicts denture 102 in an exemplary final form; that is, with barrels 130 fixed thereto, for example, by resinous cement, and with prongs 118 of denture connector entrapped by barrels 130, as will be described hereinafter.

Prong anchor 104 may include two prong reception sites 106, with one prong reception site 106 on each side of the implant connector (e.g., screw 108). This arrangement symmetrically and stably distributes forces from clamping denture 102 to prong anchor 104 by using dual prong denture connector 120.

Prong anchor 104 may comprise a bore 122 (FIG. 3B) in prong anchor 104 and a shoulder 124 in bore 122. Shoulder 124 is dimensioned and configured to entrap a head 126 (FIG. 3A) of a threaded fastener (e.g., screw 108) when a shaft 128 (FIG. 3A) of the threaded fastener is passed through bore 122.

Prong anchor 104 may further comprise the threaded fastener (i.e., screw 108) having threaded shaft 128 matingly compatible with female threads (not shown, but conventional in dental implants) of dental implant 100 and head 126 greater in a transverse dimension than threaded shaft 128.

Bore 122 and its associated threaded fastener secure prong anchor 104 to implant 100.

Figure 6:
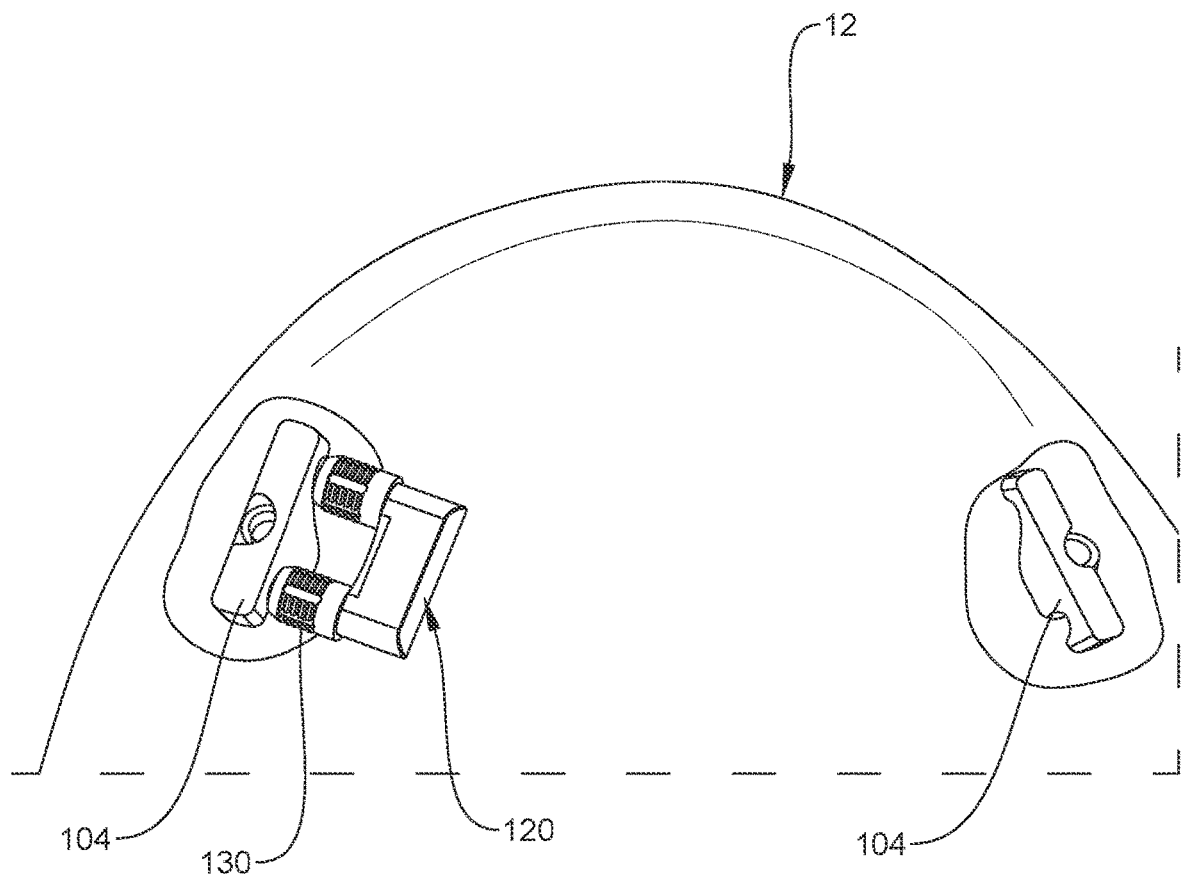
FIG. 6 is an environmental view of a patient's jaw, showing relative positions of components of FIGS. 3A, 3B, 4, and 5 as they would be installed, with a denture which is included in the novel retention system omitted for clarity in showing the depicted components.
Figure 8:
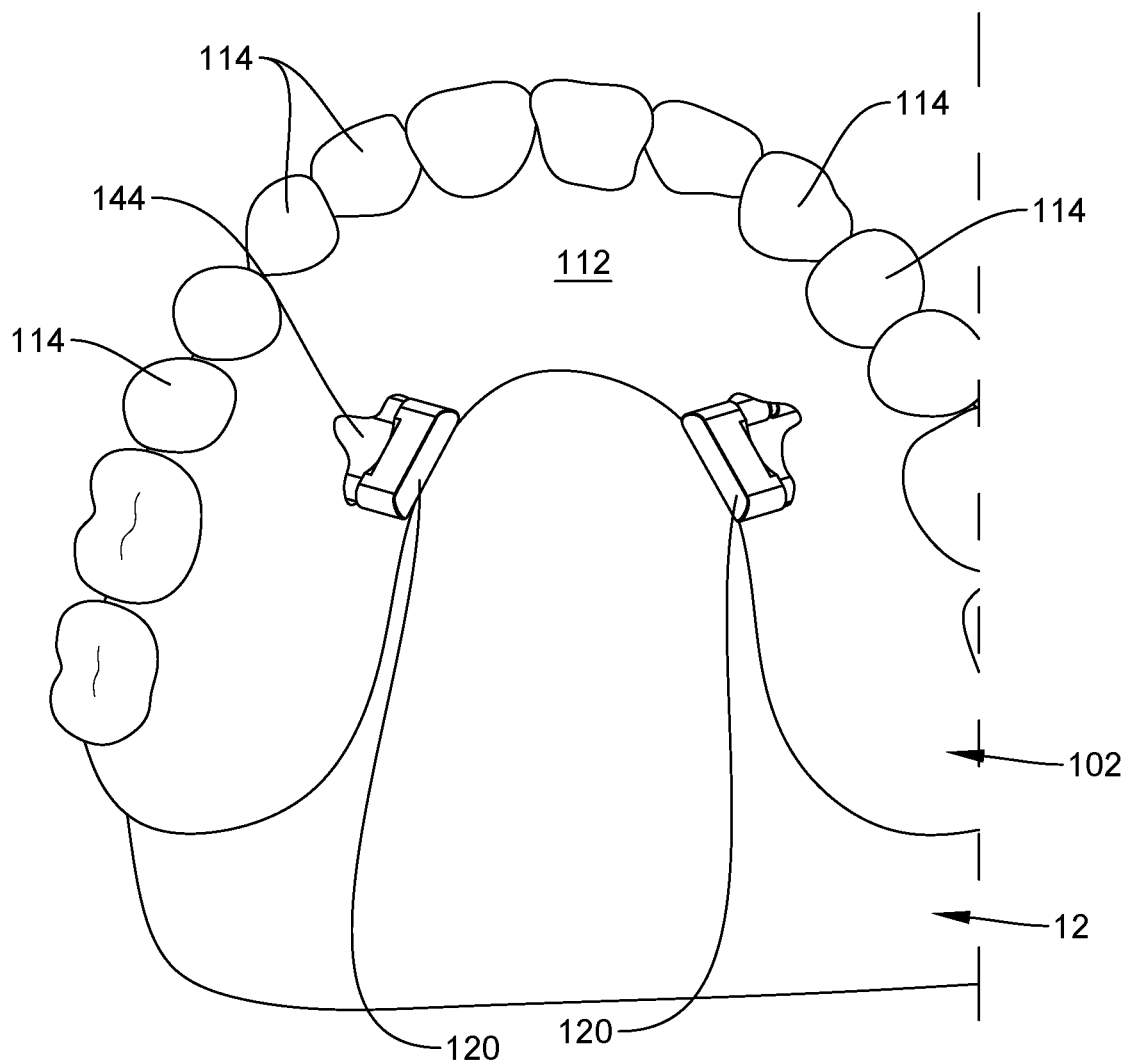
FIG. 8 is an environmental view of FIG. 6, showing the denture of FIG. 7 in a stage of installation to the patient's jaw of FIG. 6.
Figure 10:
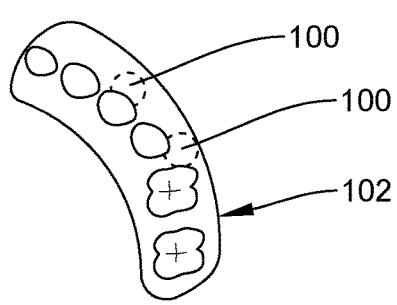
FIG. 10 is a detail view showing a variation on the denture shown in FIG. 8.

As seen in FIG. 8, denture 102 may be a full arch denture 102 spanning at least two dental implants 100 (as seen in FIGS. 6 and 9). However, as seen in FIG. 10, denture 102 may be fabricated as a partial arch denture 102 spanning at least two dental implants 100. Therefore, the novel retention system can be used when replacing all teeth of a dental arch, and also when replacing only some of the teeth of a dental arch.

Figure 11:
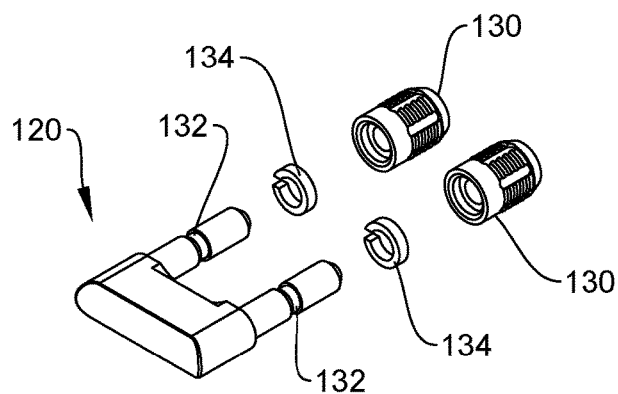
FIG. 11 is an exploded perspective detail view of components shown in FIG. 5.
Figure 12:
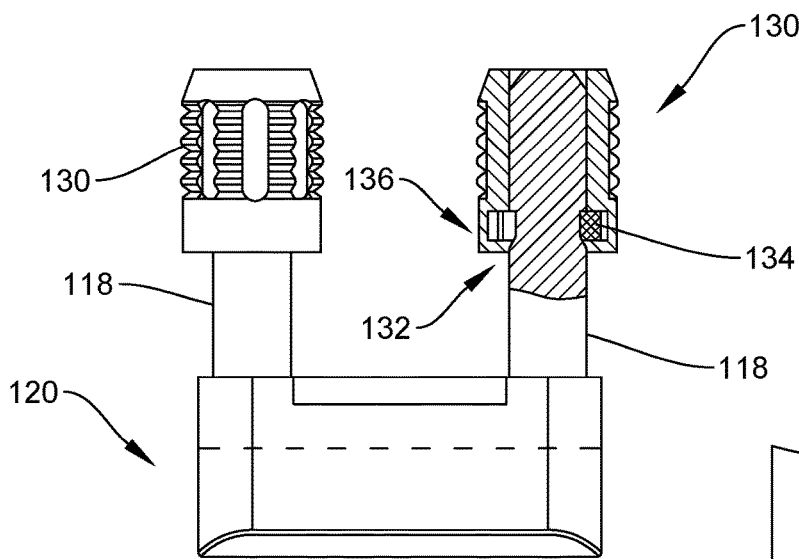
FIG. 12 is a side detail view of the components of FIG. 5, shown partially in cross section.

Referring principally to FIGS. 11 and 12, each prong passage (passages are not separately shown, but will be understood to be passages capable of slidably receiving barrels 130) of denture 120 may include a radially elastic member releasably engaging a respective prong 118 of denture connector 120 when denture connector 120 is fully installed through denture 102. Each radially elastic member may comprise a barrel (or sleeve) 130 slotted to accommodate radial expansion.

It would be possible to provide the radially elastic member in a form other than that of barrel 130. The radially elastic member guides its associated prong 118 during insertion of the latter, while providing some play to overcome the need for extreme precision. Barrel 130 enables a washer based retention feature preventing unintended disengagement of denture connector 120.

Figure 13:
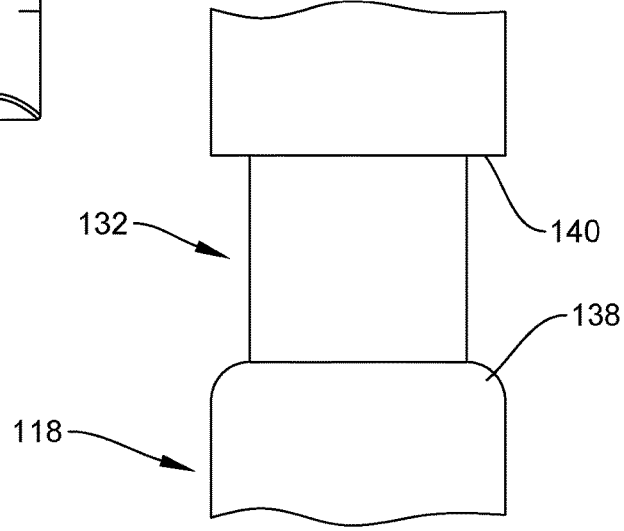
FIG. 13 is an enlarged detail view of a washer retaining groove in prongs shown in FIGS. 11 and 12.

Each one of prongs 118 may have a circumferential groove 132 for receiving an internal surface of an expansible washer 134 to retain a respective prong 118 within barrel 130. Each one of barrels 130 has an internal groove 136 (FIG. 12) for receiving an outer surface of expansible washer 134. Circumferential groove 132 may have one tapered end wall 138 (FIG. 13) to facilitate expansion of washer 134 when denture connector 120 is inserted into the retention system, and an opposed square cut end wall 140 to oppose excessive withdrawal of denture connector 120. Noting that washer 134 sits in circumferential groove 132 and is expanded first when encountering a blunt end of a prong 118 and remains expanded as it rides along the surface of the prong 118 as the denture is fully secured in place. To remove the denture, prong 118 is moved in the opposite direction until washer 134 contracts and again sits in circumferential groove 132 of prong 118. At this position, further movement of prong 118 in this opposite direction is prevented as it results in the washer 134 encountering non-tapered square cut end wall 140 of the prong 118. This encounter will not expand washer 134, and excessive withdrawal of prongs 118 is prevented.

The purpose of circumferential grooves 132 is to retain denture connector 120 on denture 102. When a prong 118 is first inserted through a corresponding barrel 130 to seat the denture, washer 134 is expanded by contact with the blunt end of each prong 118, constricts as it passes over circumferential groove 132. As prong 118 is pushed further through barrel 130 to enable prong 118 to penetrate prong reception site 106, tapered end wall 138 facilitates expansion of washer 134, the latter spreading or opening to accommodate passage of prong 118 to the fully installed position.

However, should a person attempt to withdraw prong 118, travel of prong 118 is stopped as square cut end wall 140 encounters washer 134. Because of the lack of taper, washer 134 is not urged to open or spread, and further withdrawal of prong 118 is opposed by interference with washer 134, the latter entrapped by corresponding groove 136 of barrel 130. Thus denture connector 120 is prevented from inadvertent loss, while still enabling sufficient withdrawal to manually remove denture 102 from the mouth.

The radial elastic member (e.g., barrels 130) frictionally retains prongs 118 in place. Prongs 118 interengage prong reception sites 106 to retain denture 102 against the jaw by interference fit.

Denture 102 may further comprise a recess 144 configured to provide access for a pry tool (not shown) to dislodge denture connector 120 from an installed position in the retention system.

Implant 100, prong anchor 104, seat 110, denture connector 120, and reinforcement bar 142 may be fabricated from a biocompatible metal such as titanium or titanium alloy. It is contemplated that prong anchor 104, denture connector 120, and reinforcement bar 142 will be fabricated with dimensions and configuration unique to each patient. Denture 102 may utilize conventional dental resins cast around reinforcement bar 142.

While the novel retention system has been described in terms of two prongs 118 on each denture connector 120 and two implants 100, the number of prongs 118 and implants 100 used may be greater than two.

Drawings are drawn to internal scale, and also to external scale. By internal scale it is meant that the parts, components, and proportions thereof in the illustrated inventive example are drawn to scale relative to one another. As employed herein, external scale refers to scale of the illustrated example relative to scale of environmental elements or objects, regardless of whether the latter are included in the drawings. Where the inventive example claims external scale, the inventive and environmental elements may of course not be drawn to real or true life scale; rather, external scale signifies only that both the invention and environmental elements are drawn in scale to each other.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A retention system for frictionally retaining a denture to a jaw of a patient, the retention system comprising:
    at least one prong anchor having a plurality of prong reception sites and an implant connector configured to secure the prong anchor to a dental implant, wherein said at least one prong anchor includes two said prong reception sites, with one said prong reception site on each side of the implant connector;
    a denture comprising a base, at least one prosthetic tooth mounted to the base, at least one opening in the base, the opening dimensioned and configured to receive an exposed portion of said at least one prong anchor therein, and a plurality of a parallel prong passages in the base; and
    a denture connector having a plurality of parallel prongs dimensioned and configured to pass through said parallel prong passages of the denture and to be received within the prong reception sites of said at least one prong anchor, wherein
    the prong reception sites of said at least one prong anchor and said parallel prong passages of the base of the denture are oriented to enable the parallel prongs of the denture connector to pass through the denture and be received laterally within said prong reception sites when said at least one prong anchor is coupled to the dental implant.

2. The retention system of claim 1, wherein said at least one prong anchor comprises a bore in the prong anchor and a shoulder in the bore, the shoulder dimensioned and configured to entrap a head of a threaded fastener when a shaft of the threaded fastener is passed through the bore, and
    the threaded fastener having a threaded shaft matingly compatible with female threads of the dental implant and a head greater in a transverse dimension than the threaded shaft.

3. The retention system of claim 1, wherein the denture is a partial arch denture spanning at least two dental implants.

4. The retention system of claim 1, wherein the denture is a full arch denture spanning at least two dental implants.

5. The retention system of claim 1, further comprising a metallic reinforcement bar in the base of the denture, to distribute and spread loads imposed by chewing when the denture is installed in the patient.

6. The retention system of claim 1, wherein the denture further comprises a recess configured to provide access to dislodge the denture connector from an installed position in the retention system.

7. A retention system for frictionally retaining a denture to a jaw of a patient, the retention system comprising:
    at least one prong anchor having a plurality of prong reception sites and an implant connector configured to secure the prong anchor to a dental implant;
    a denture comprising a base, at least one prosthetic tooth mounted to the base, at least one opening in the base, the opening dimensioned and configured to receive an exposed portion of said at least one prong anchor therein, and a plurality of parallel prong passages in the base;
    a denture connector having a plurality of parallel prongs dimensioned and configured to pass through said parallel prong passages of the denture and to be received within the prong reception sites of said at least one prong anchor; wherein
    the prong reception sites of said at least one prong anchor and said parallel prong passages of the base of the denture are oriented to enable the parallel prongs of the denture connector to pass through the denture and be received laterally within said prong reception sites when said at least one prong anchor is coupled to the dental implant; and wherein
    each said prong passage of the denture includes a radially elastic member releasably engaging a respective said prong of the denture connector when the denture connector is fully installed through the denture.

8. The retention system of claim 7, wherein each said radially elastic member comprises a barrel slotted to accommodate radial expansion.

9. The retention system of claim 8, wherein
each one of the prongs has a circumferential groove for receiving an internal surface of an expansible washer to retain the barrel to a respective said prong; and
each one of the barrels has an internal groove for receiving an outer surface of the expansible washer.

10. The retention system of claim 9, wherein the circumferential groove of each one of said prongs has one tapered end wall to facilitate expansion of the expansible washer when the prongs of said denture connector is passed through the denture and into said prong reception sites of said at least one prong anchor, and an opposed square cut end wall to oppose travel of the prongs past the denture when the denture connector is removed from said prong reception sites of said at least one prong anchor.

* * * * *